UNITED STATES PATENT OFFICE.

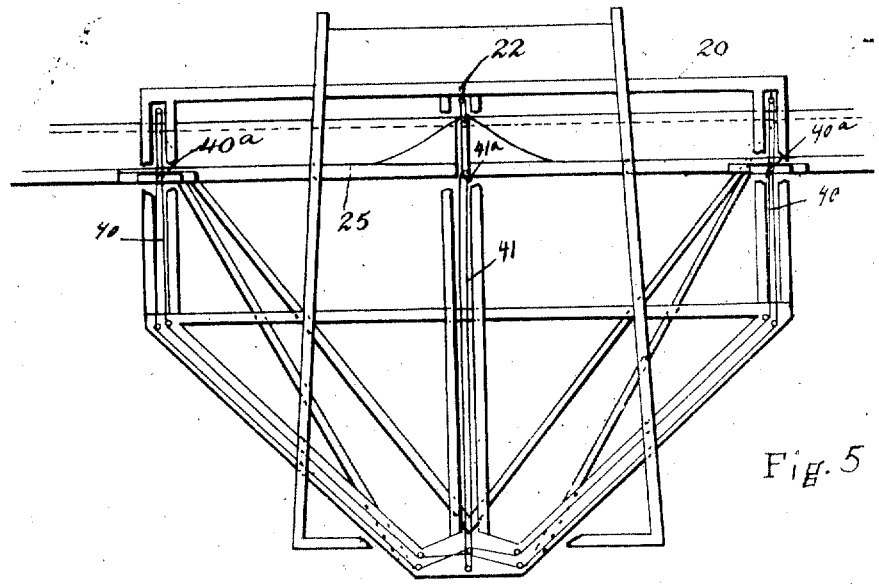
Fig. 5
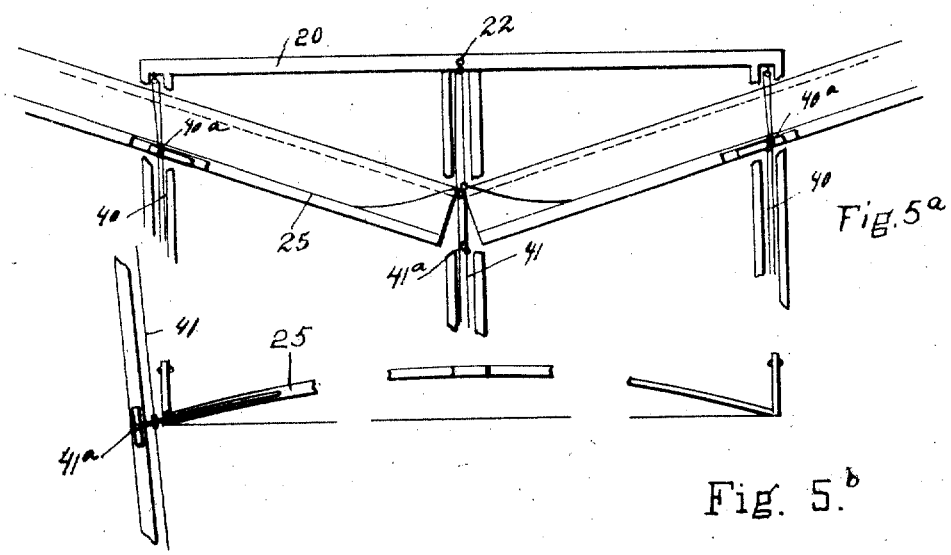
Fig. 5ᵃ
Fig. 5.ᵇ

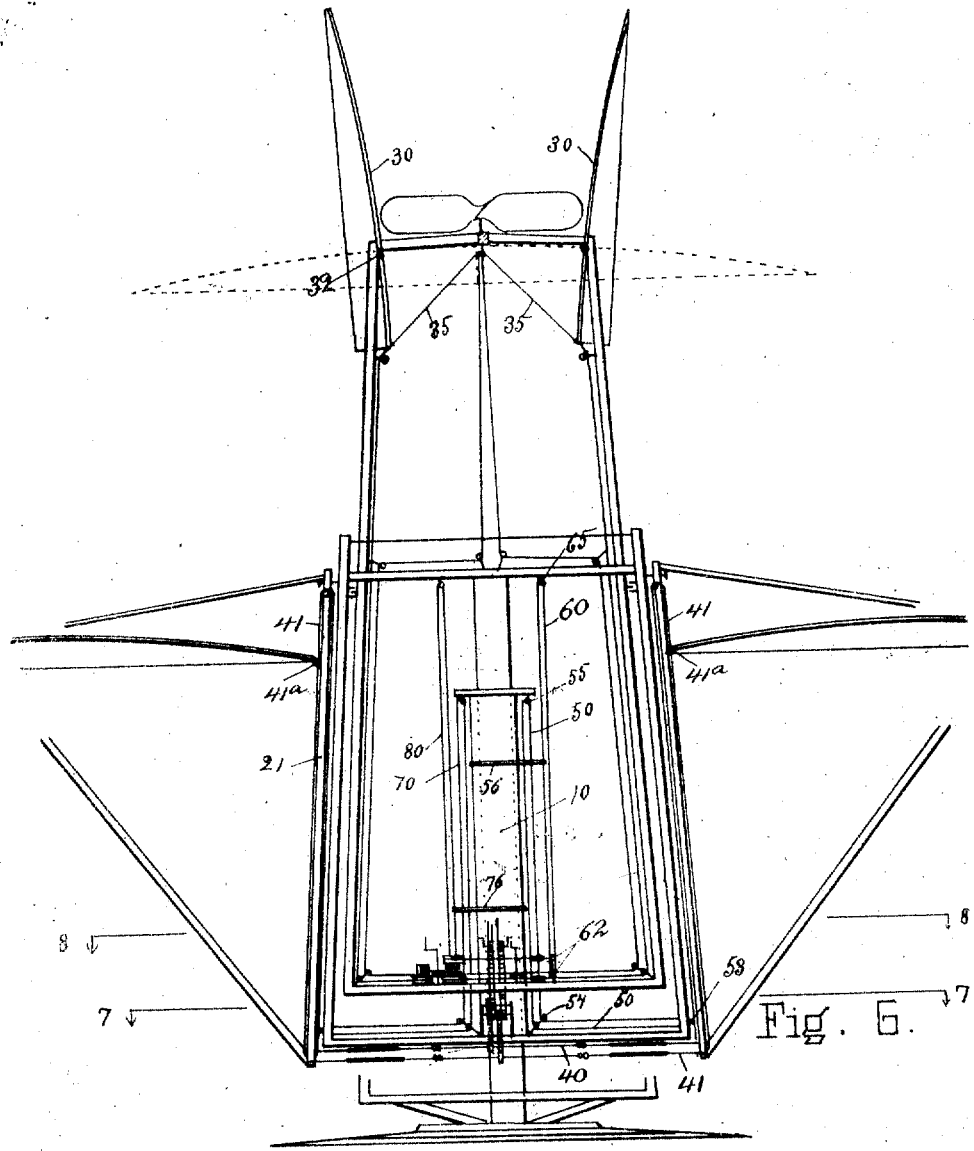

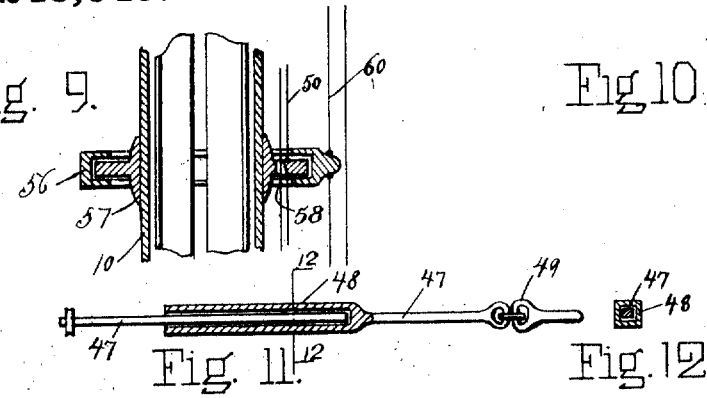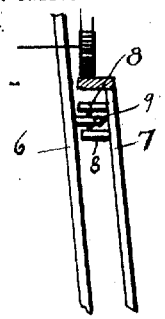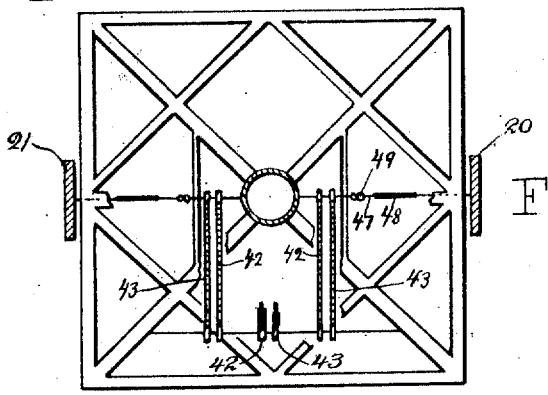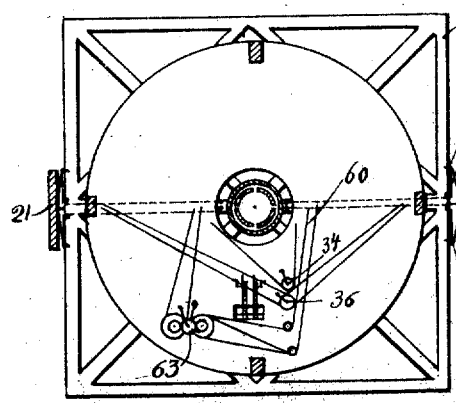

HANS J. M. RASMUSSEN, OF CHICAGO, ILLINOIS.

AEROPLANE.

1,248,545.   Specification of Letters Patent.   Patented Dec. 4, 1917.

Application filed March 8, 1913. Serial No. 752,853.

*To all whom it may concern:*

Be it known that I, HANS J. M. RASMUSSEN, a subject of the King of Denmark, residing at Chicago, county of Cook, State of Illinois, have invented a certain new and useful Improvement in Aeroplanes, and declare the following to be a full, clear, and exact description of the same, such as will enable others skilled in the art to which it pertains to make and use the same, reference being had to the accompanying drawings, which form a part of this specification.

My invention relates to flying machines of the kind which are heavier than air and has for its object to produce a simple and novel construction and arrangement of planes which will give a wider range of control both as to direction of flight and with reference to maintaining stability and which, if desired, will permit the machine to rise directly from a position of rest.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Fig. 5 is a section somewhat similar to Fig. 4 taken at one side of the longitudinal axis;

Fig. 5ª is a view corresponding to the upper portion of Fig. 5, showing the main planes in a different position from that occupied in Fig. 5.

Fig. 5ᵇ is an edge view of one of the planes, with parts broken away, together with a piece of the swinging frame.

Figure 1:
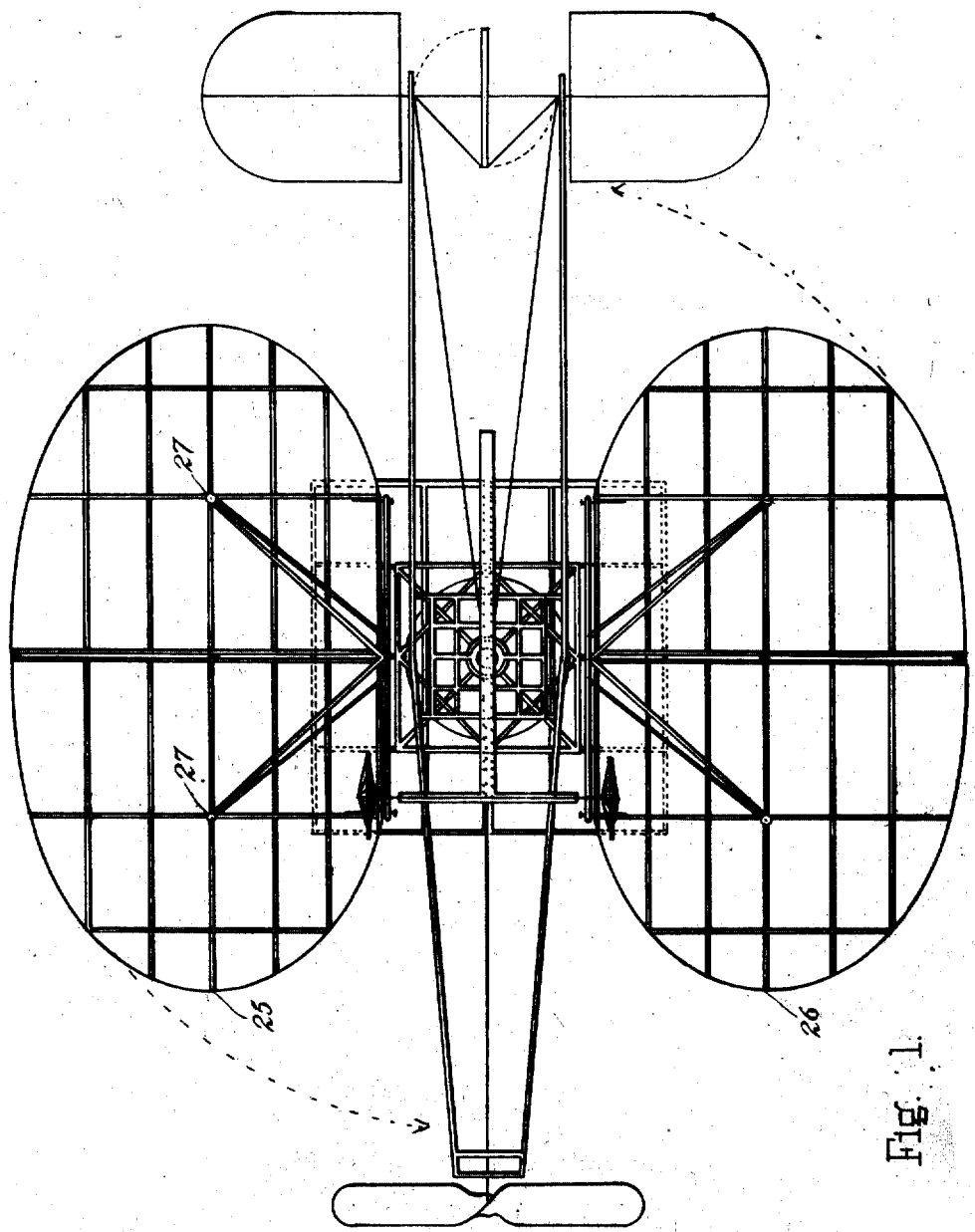
Figure 1 is a bottom plan view of a machine arranged in accordance with a preferred form of my invention.
Figure 2:
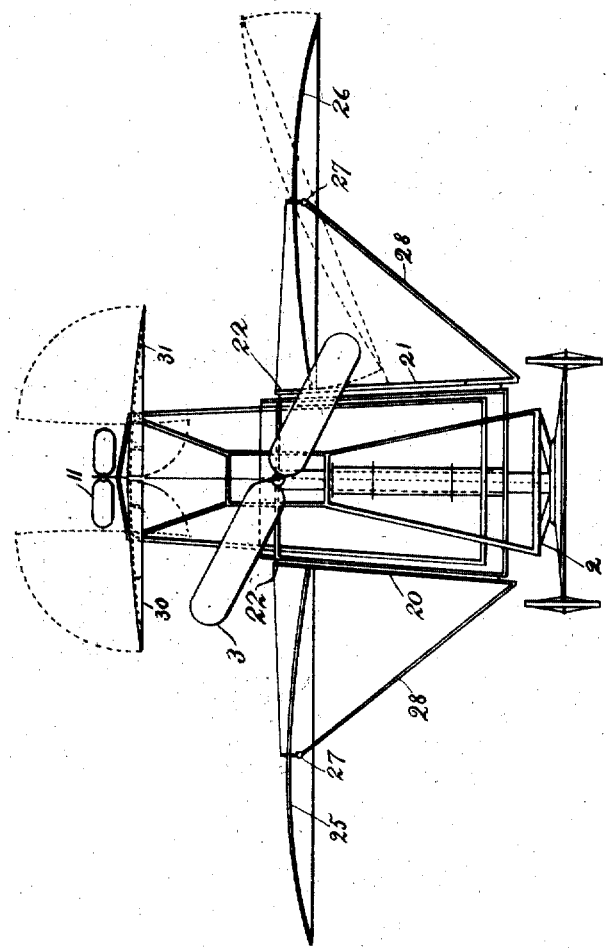
Fig. 2 is a front elevation of the machine.
Figure 3:
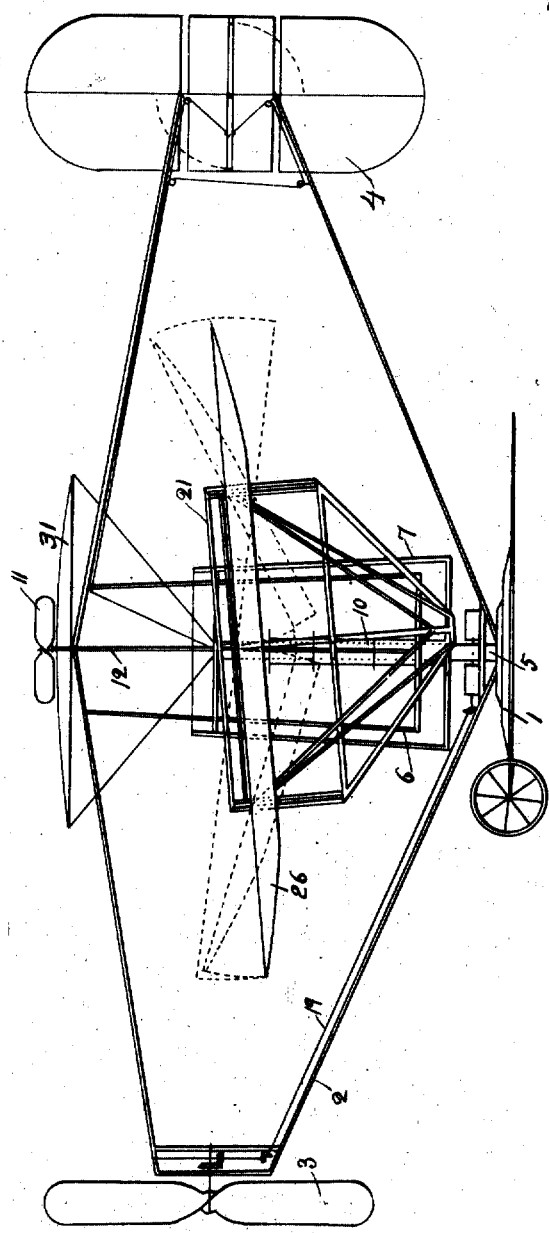
Fig. 3 is a side elevation.
Figure 4:
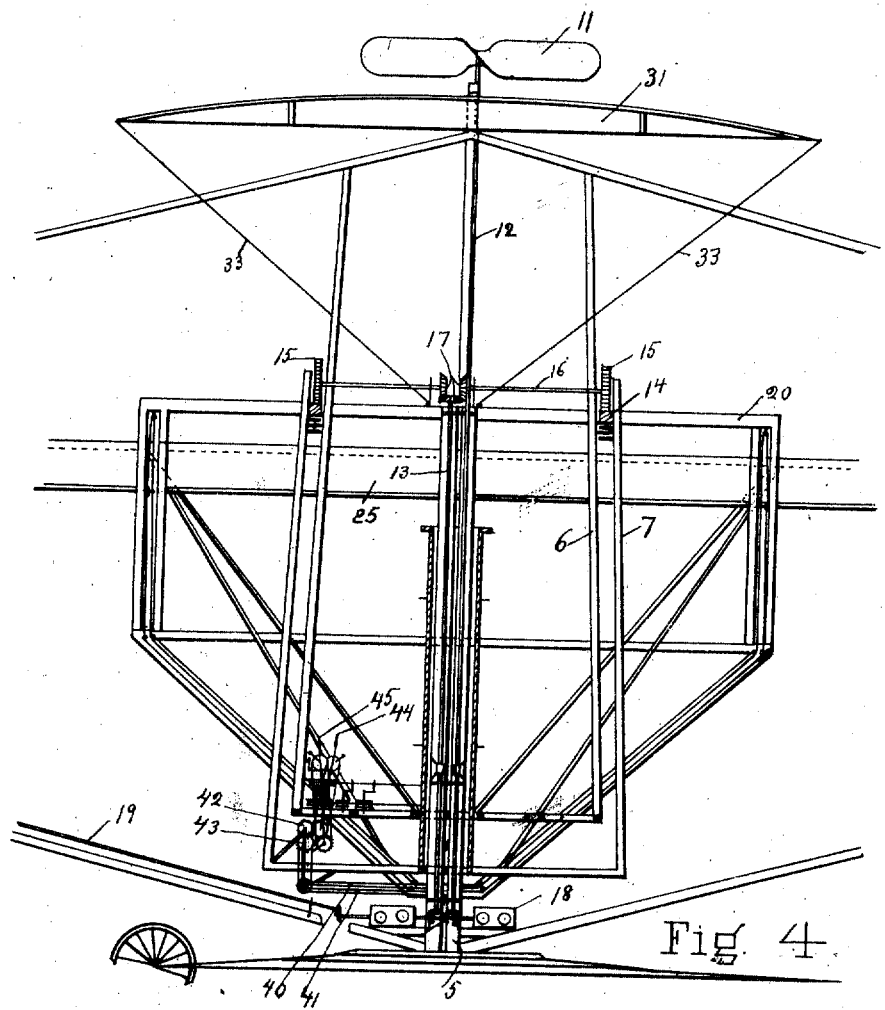
Fig. 4 is a longitudinal vertical section on a somewhat larger scale, the ends of the machine being omitted.

Fig. 6 is a central vertical section taken at right angles to the plane of Fig. 4;

Fig. 7 is a section taken approximately on line 7—7 of Fig. 6;

Fig. 8 is a section taken approximately on line 8—8 of Fig. 6;

Fig. 9 is a central vertical section through a fragment of the main supporting column for the carriage;

Fig. 10 is a detail showing the manner in which the rotating carriage or frame is mounted on the stationary carriage;

Fig. 11 is a detail of the connections for one of the controlling cables; and

Fig. 12 is a section on line 12—12 of Fig. 11.

Referring to the drawings, 1 represents a suitable truck on which is mounted a suitable open frame, 2, carrying on one end a propeller, 3, and on the other end a rudder and balancing plane device, 4. Between the ends of the frame is a hollow vertical post or column, 5, and surrounding this column or post is a main carriage, 6, supported at its upper end from the upper portion of the main frame. The main carriage does not extend down to the truck or to the lower members of the main frame but lies at some distance above the same so as to leave an unobstructed space beneath it and surrounding the post or column. Surrounding the main carriage is an auxiliary carriage, 7, which is connected to and supported by the main carriage in such a way that it can rotate freely around the same and at the same time be held against vertical movement thereon. This connection may conveniently take the form illustrated in Fig. 10, the carriage 7 having near its upper end a pair of separated parallel annular tracks 8, between which extends an annular flange or track, 9, carried by the stationary carriage. Suitable friction bearings may be placed between the tracks so that the auxiliary carriage may revolve on the stationary carriage without meeting any considerable frictional resistance. Surrounding the column or post 5 and revoluble thereon is an elongated tubular member, 10, which is fixed at its lower end to the bottom of the auxiliary carriage so as to revolve therewith, the member 10 passing through an opening in the bottom of the stationary carriage.

If desired, there may be a second propeller, 11, arranged to revolve about a vertical axis at the top of the machine. This latter propeller may conveniently be mounted on the upper end of the shaft 12 which extends down through the hollow post 5. A second shaft, 13, extending down through the hollow post serves to drive the rotatable carriage; this being accomplished by providing the rotatable carriage with an annular rack, 14, with which mesh gears, 15, mounted on transverse shafts, 16, which are in turn geared to the upper end of the shaft 13 as indicated at 17. The engine or motor for the machine may be conveniently mounted on the frame below the two carriages as indicated at 18, the shaft of the engine or motor extending transversely through the hollow post and being geared to the shafts 12 and 13, suitable clutches being of course provided so that either or both shafts 12 and 13 may be disconnected from the engine. The engine shaft is also geared to a suitable shaft, 19, which extends to the propeller 3 and is geared to or otherwise connected with the propeller to actuate the same.

At opposite sides of the machine are arranged vertical swinging frames, 20 and 21, these frames being pivotally connected at the center and near the top thereof to the rotating carriage, as indicated at 22. On these frames are mounted the main planes of the machine. In the arrangement shown, each of the main planes 25 and 26 is made in two parts, each plane being divided in the middle along a transverse line so as to have a front half and a rear half. Each half of each plane is supported at about its center of gravity by a universal joint, 27, these joints being preferably between the members of the planes and outwardly and upwardly projecting braces or arms, 28, secured to the swinging frames below the planes. This arrangement permits each plane to be swung as a unit about a horizontal axis by simply swinging the frame on which it is mounted, it being possible to tilt both of the planes in the same direction or in opposite directions so as to give them a screw formation. Each plane can also be swung as a unit about a longitudinal horizontal axis passing through its center of gravity, or the two halves of each plane may be swung about transverse axes passing through their points of support. It will thus be seen that when the auxiliary carriage is not revolving, the main planes may be shifted into various positions to control the elevation and the balance both when moving in a straight line up or down or in turning curves either to the right or to the left. It will also be seen that by adjusting the planes into the form of a screw and setting the revoluble carriage in rotation, a powerful lifting effort will be created so that the machine may be raised from a position of rest, being given also a forward movement if the main propeller is operating. The lifting force may be increased by setting also the upper propeller, 11, in operation.

In the arrangement shown, there are auxiliary planes, 30 and 31, supported on the main frame of the machine above the carriages and below the auxiliary propeller. The auxiliary planes are preferably supported in about the same way as the main planes although each is preferably made in the form of a single member instead of being divided into two parts. In the arrangement shown, the auxiliary planes are supported on universal joints, 32, at approximately the longitudinal center and at a distance from the outer edges equal to about two-thirds of the width of the planes. This permits each plane to be tilted about a transverse horizontal axis, this axis being the same for both palnes, and it also permits them to be tilted about separated horizontal axes extending longitudinally of the machine.

The several planes may be operated by means of suitable cables or the like extending to suitable controllers mounted within the main carriage. Where it is desired to be able to give the main planes a rotary movement, as illustrated, provision must be made to prevent such rotary movement from interfering with the necessary cables or connections and to permit the main planes to be shifted, while rotating, to vary their inclinations.

The tilting of the auxiliary planes about the transverse axis may be accomplished by means of cables, 33, connected to the front and rear ends of these planes and extending over suitable guides to a controller, 34, in the main carriage. Similarly the shifting of the auxiliary planes around the longitudinal axes may be accomplished by suitable endless cables, 35, each of which is connected to the inner edge of one of the planes and both of which extend down to a suitable controller, 36, in the main carriage.

The tilting of the main planes about longitudinal axes, and the tilting of the two halves of each plane about transverse axes may be accomplished by means of suitable endless cables, 40 and 41, respectively, these cables being mounted to run over suitable guides or pulleys on the two swinging frames. Each of the cables 40 is connected to the inner edge of one of the halves of the main planes, at a point between the ends of that half, as indicated at 40[a], while each of the cables 41 is connected to one of the halves of the planes at a point somewhere along the dividing line between the two complementary halves, as indicated at 41[a]. If the cables 40 are actuated alone, each main plane will be tilted as a unit about its longitudinal pivotal axis. If only the cables 41 are actuated, the two halves of each plane will be swung around their individual transverse pivotal axes. Since the swinging frames are carried by the revoluble carriage, some provision must be made for disconnecting the actuating means for the cables 40 and 41 from the controllers in the stationary carriage at the times when the other carriage is revolving. To this end I have arranged in the bottom of the rotatable carriage a controlling and holding device, 42, for the cables 40 and a similar device, 43, for controlling the cables 41. In the main carriage is a suitable operating member, 44, adapted to be swung into and out of operative relation to the device 42 together with a similar operating member, 45, for the device 43. Ordinarily, when the auxiliary carriage is not rotating, the operating members 44 and 45 may be brought into engagement with the holding and actuating members for the cables 40 and 41, being disconnected, however, when the auxiliary carriage is to be rotated.

Since the swinging frames are movable on the auxiliary carriage, the cables 40 and 41 cannot be connected directly to the holding and operating members 42 and 43, but the connection must include some means to compensate for the swinging movement of the frames. In the arrangement shown, there is connected between each of the members 42 and 43 and the cables controlled thereby a shaft, 47, having a slip joint, 48, and a hinge joint, 49, as best shown in Figs. 11 and 12. The cables 40 and 41 are controlled by the rotation of these shafts and, as the frames 20 and 21 are swung, the slip joints and the joints 49 in the shafts 47 permit the shafts to become lengthened and to swing into positions making an angle with the normal positions.

The means for moving the swinging frames and thus tilting the main planes bodily about a transverse axis is as follows: As will best be seen in Fig. 8, an endless cable, 50, is connected in any suitable way to the frame 20. The portions of the cable lying on opposite sides of the point of connection of the swinging frame pass over two pulleys, 51 and 52, mounted on the auxiliary frame 7 and separated from each other in the longitudinal direction. The two portions of the cable then extend toward each other and pass over pulleys, 53, mounted on the revoluble carriage at its transverse axis. As will best be seen in Fig. 6, the two strands of the cable, after leaving the pulleys 53, are led to two pulleys, 54, lying just at one side of the sleeve or tube 10 and from there extend up the side of the tube and over a pulley, 55, at the top. It will thus be seen that the cable 50 is brought up inside of the stationary carriage and supported in such a way that it may revolve with the auxiliary carriage. Loosely surrounding the tubular member 10 is a ring, 56, the details of which are best shown in Fig. 9. Within this ring and slidable on the member 10 is a second ring, 57, the two rings being interlocked so that they may rotate relative to each other but are compelled to move up and down the tubular member as a single unit. One strand of the cable 50 is fastened to the ring 57 and the other passes freely through an opening, 58, in the ring.

Associated with the outer ring, 56, is an endless cable, 60, one strand of which is secured to the outer ring and the other not. This cable passes over a pulley, 61, fastened to a stationary part of the framework and from there down over a pulley or pulleys, 62, on the floor of the main carriage. From the pulley or pulleys 62 the cable passes to a suitable controller, 63. By actuating the controller 63 the ring 56 may be moved up and down along the member 10, carrying with it the ring 57 and thus causing the cable 50 to be actuated and swinging the frame 20 in one direction or the other. A cable 70 corresponding to the cable 50 and a cable 80 corresponding to the cable 60 are associated with the swinging frame 21, cooperating with a ring, 76, corresponding to the ring 56, so that the frame 21 may be swung in the same way as the frame 20. The structural details of the controller 63 may be varied in a great many different ways, but I prefer to have this controller so arranged that either plane may be actuated independently of the other or both be actuated together so as to make it possible to secure any desired combination of angular positions of the two main planes while the auxiliary carriage is rotating.

I claim:

1. In a flying machine, a frame, horizontal planes lying on opposite sides of the axis of the machine, each of said planes comprising two parts lying on opposite sides of a transverse line, and supporting means for said planes constructed and arranged to permit each plane as a whole to be moved angularly about two horizontal axes at right angles to each other and each part of each plane to be moved angularly about a transverse horizontal axis.

2. An aeroplane having main planes, and means for supporting said planes so as to permit them to be arranged either in approximately horizontal planes or in V-shaped formation as viewed from the front and also from the side of the aeroplane, and auxiliary planes lying above and between the main planes.

3. In an aeroplane, a frame, main planes lying on opposite sides of the main frame, means for supporting the main planes so as to permit each to be swung about a transverse axis and a longitudinal axis, auxiliary planes lying above the frame and over the space between the main planes, and means for supporting the auxiliary planes so as to permit each to be swung about axes parallel with the aforesaid axes.

4. In an aeroplane, a frame, horizontal planes lying on opposite sides of the frame, each of said planes comprising two parts lying on opposite sides of a transverse line, and supporting means for said planes constructed and arranged to permit each plane to be moved angularly about a longitudinal axis so as to bring its outer edge above the inner edge and each part of each plane to be moved angularly about a transverse horizontal axis so as to bring the front and rear ends of the planes higher than the middle portions.

5. An aeroplane having main planes, and means for supporting said planes so as to permit them to be moved from horizontal positions to positions which give them the appearance of a V viewed from the front and also from the side.

6. In an aeroplane, a frame, horizontal planes lying on opposite sides of the frame, means for mounting said planes so as to permit each to be swung about a transverse horizontal axis and a longitudinal horizontal axis passing approximately through the center of the plane, and means for revolving said planes about a vertical axis.

7. In an aeroplane, a frame, main horizontal planes mounted on the frame so as to be capable of swinging about two horizontal axes at right angles to each other, and means for revolving said frame about a vertical axis arranged between the planes.

8. In an aeroplane, a main frame, vertically arranged auxiliary frames hung from their upper ends at opposite sides of the main frame so as to be movable about a horizontal transverse axis, a plane carried by each of said auxiliary frames and arranged to be moved angularly thereon about a longitudinal axis, and means connected with the lower end of each auxiliary frame for swinging the same.

9. In an aeroplane, a frame, horizontal planes lying on opposite sides of the longitudinal axis of the frame, each plane being divided into two parts along a transverse line, the parts of each plane being so arranged that when in alinement they form a continuous surface, means for swinging each plane as a whole about a longitudinal axis, and means for swinging the parts of each plane about parallel transverse axes so as to bring the adjacent ends of the parts of each plane below the front and rear ends.

10. An aeroplane having main planes, and means for supporting said planes so as to permit them to be arranged either in approximately horizontal planes or into a V-shaped formation as viewed from the front and also from the side of the aeroplane.

11. In an aeroplane, a frame, horizontal planes lying on opposite sides of the longitudinal axis of the frame, each plane being divided into two parts along a transverse line, the parts of each plane being so arranged that when in alinement they form a continuous surface, means for swinging each plane as a whole about a transverse axis, and means for swinging the parts of each plane about parallel transverse axes.

12. In an aeroplane, a frame, horizontal planes lying on opposite sides of the longitudinal axis of the frame, each plane being divided into two parts along a transverse line, the parts of each plane being so arranged that when in alinement they form a continuous surface, means for swinging each plane as a whole about its longitudinal center line, and means for swinging the parts of each plane about parallel transverse axes.

13. In an aeroplane, a frame, horizontal planes for lifting the machine lying on opposite sides of the longitudinal axis of the machine, means for mounting each of said planes on said frame so as to permit it to be moved angularly about two horizontal axes extending respectively transversely and longitudinally through the approximate center of the plane; and means for controlling the planes so as to permit them to be moved as a single plane about the said transverse axis, or to be moved in unison about the corresponding longitudinal axes or to be shifted so as to produce a screw formation or a partial screw formation.

In testimony whereof, I sign this specification in the presence of two witnesses.

HANS J. M. RASMUSSEN.

Witnesses:
WM. F. FREUDENREICH,
RUTH E. ZETTERVALL.